United States Patent [19]

Hommen et al.

[11] Patent Number: 4,592,597
[45] Date of Patent: Jun. 3, 1986

[54] HYDRAULIC BRAKE FOR VEHICLES

[75] Inventors: Winfried Hommen; Georg Stäuble; Tiberius Wieser, all of Munich, Fed. Rep. of Germany

[73] Assignee: Knorr-Bremse GmbH, Munich, Fed. Rep. of Germany

[21] Appl. No.: 759,000

[22] Filed: Jul. 25, 1985

[30] Foreign Application Priority Data

Jul. 25, 1984 [DE] Fed. Rep. of Germany ....... 3427440

[51] Int. Cl.$^4$ ............................................. B60T 13/70
[52] U.S. Cl. ........................................ 303/15; 303/86; 188/348; 188/151 A
[58] Field of Search .................... 188/151 A, 347, 348, 188/351, 107, 153 R; 303/9, 13, 15, 46, 63, 80, 86, 87, 116, 119

[56] References Cited

U.S. PATENT DOCUMENTS

| 2,423,204 | 7/1947 | Rockwell | 188/348 |
| 2,957,659 | 10/1960 | Yarber | 303/119 X |
| 3,275,383 | 9/1966 | Baechtel | 303/13 X |
| 3,532,391 | 10/1970 | Klein | 303/116 X |
| 3,893,544 | 7/1975 | Means | 188/351 X |

Primary Examiner—Bruce H. Stoner, Jr.
Assistant Examiner—Michael P. Gilday
Attorney, Agent, or Firm—Pollock, Vande Sande & Priddy

[57] ABSTRACT

Hydraulic vehicle brake comprising a hydraulic accumulator (1), a brake valve adjustment device (4) supplied thereby, and a brake pressure line section (7) to the brake cylinders attached to the latter via an emergency brake valve (6). In the emergency braking position of the emergency brake valve, this connection is broken, and the brake pressure line section is directly connected to the hydraulic accumulator via a nozzle (10) which is bridged by a cylinder (13) in which a piston is sealingly displaceable. A spring (17) biases the piston in the displacement direction to the accumulator side end connection (11) of the cylinder. During emergency braking, the piston (14) first forces an amount of hydraulic medium sufficient for brake application out of the brake cylinder side chamber (16) of the cylinder (13). This is followed by a damped increase in brake pressure through additional supply of hydraulic medium from the hydraulic accumulator (1) through the nozzle (10) into the brake cylinders. The brake assures rapid brake application during emergency braking, with subsequent damped brake pressure increase, so that shocks and jolts resulting from emergency braking are kept within acceptable limits.

4 Claims, 4 Drawing Figures

HYDRAULIC BRAKE FOR VEHICLES

FIELD OF THE INVENTION

The present invention relates to a hydraulic brake for vehicles, especially rail vehicles, with a brake adjustment valve device supplied from a hydraulic accumulator for forming a brake pressure to be conducted to brake cylinders, an emergency brake valve being arranged between the brake valve adjustment device and the brake cylinders, which emergency brake valve in its operative position connects the brake adjustment valve device with the brake cylinders, and in its emergency braking position interrupts this connection and connects the hydraulic accumulator to the brake cylinders via a calibrated passage.

BACKGROUND OF THE INVENTION

In hydraulic brakes of this type there is the problem that the calibrated passage must be so dimensioned that, on the one hand, the rapid braking required for emergency braking is assured, and that, on the other hand, shocks and jolts during the braking process must be limited to levels acceptable for passengers in other vehicles which may coupled to the vehicle being braked.

The problem to be solved is illustrated in FIGS. 1 and 2.

FIG. 1 is related to a hydraulic brake in which the calibrated passage determining pressure increase during emergency braking is relatively large. If, with released brakes at time 0, the emergency brake valve is switched to its emergency braking position, time interval 0–A, referred to as dead time, elapses while the relatively large dead volume of the brake cylinder fills with hydraulic medium and the piston in the brake cylinder performs its idle stroke, until the vehicle brakes are applied when time A is reached. Hence, during the interval 0–A, there is no significant rise in braking pressure. After application of the vehicle brakes, the hydraulic medium continuing to flow into the brake cylinders through the calibrated passage firmly applies the brakes, if appropriate with elastic loading of the hydraulic and mechanical braking elements, causing a rather rapid rise in brake pressure until moment B. At this point, the maximal brake pressure acceptable by the brake cylinders is reached; this may correspond to the pressure of the hydraulic accumulator or the switching pressure of a conventional pressure limiting valve downstream of the accumulator and possibly subject to additional control dependent on vehicle load. From moment B on, the brake pressure remains substantially constant.

As already mentioned, FIG. 1 is based on a relatively large calibrated passage, which assures relatively rapid brake application, so that dead time 0–A is short. The relatively large calibrated passage also assures rapid increase in braking pressure during the clamping phase of the vehicle brake; for this reason, the pressure increase gradient starts very suddenly and rises very steeply. The rapid transition and the steep pressure increase gradient result in a large shock and jolt load during the braking process, which is not acceptable for the passengers of the vehicle. In the case of several coupled vehicles, there is the additional danger that the brakes of the individual vehicles are applied at slightly different moments, causing further shocks or jolts between the coupled vehicles due to abutment or drag phenomena.

In order to prevent large shock or jolt loads during emergency braking, it seems desirable to use a relatively small calibrated passage, so that after brake application, through the avoidance of a rude transition, there is a gradual increase in braking pressure until maximal brake pressure is attained. This is shown schematically in FIG. 2. In this case, there are lesser delay changes for the vehicle, and differential braking developments on coupled vehicles lead to lesser braking differences. In short, there is emergency braking in which the shocks and jolts are limited to acceptable values. It is however clear from FIG. 2 that the narrow calibrated passage so throttles the inflow of hydraulic medium into the brake cylinders that a long dead time 0–A is required for filling the latter in order to overcome the brake application stroke, i.e., up to the point of brake application. Moreover, a large time interval A–B is required during which the brake pressure rises to its maximum. The full braking effect is thus reached only after a long time interval 0–B, and this does not meet the speed requirements during emergency braking.

OBJECT OF THE INVENTION

It is an object of the invention to provide a hydraulic brake of the type described performing in such manner that, during emergency braking, despite the avoidance of excessive shock and jolt loads, sufficiently rapid braking of the vehicle up to the maximum braking level is assured. At the same time, the costs of construction are also to be minimized.

SUMMARY OF THE INVENTION

This object is attained by locating a nozzle which limits the brake pressure gradient to limited shock and jolt braking in the connection between the hydraulic accumulator and the emergency brake valve by connecting the hydraulic lines on both sides of the nozzle with end connections on both sides of a cylinder, and by sealingly displaceably positioning in the cylinder a piston which is resiliently biased for displacement in the direction to the end connection at the hydraulic accumulator side. The limited shock and jolt braking thereby constitutes a limitation of shocks and jolts to levels acceptable to the occupants of the vehicle.

BRIEF DESCRIPTION OF THE DRAWINGS

In order that the invention may be more clearly understood, reference will now be made to the accompanying drawings, in which an embodiment of the invention is shown for purposes of illustration, and in which.

DETAILED DESCRIPTION

Figure 3:
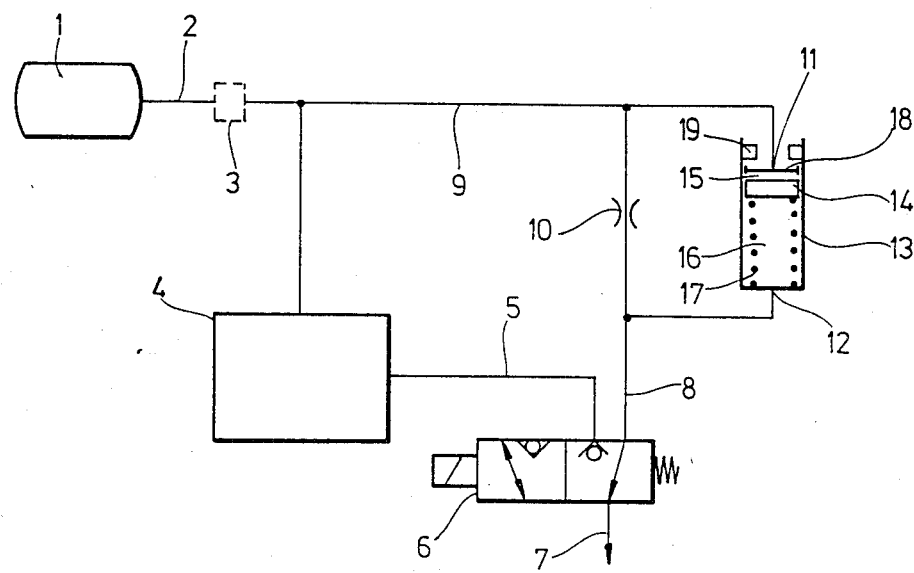
FIG. 3 shows schematically the structure of the hydraulic brake according to the invention.

As shown in FIG. 3, a line 2 leads from a hydraulic accumulator 1, which is loadable by a hydraulic pump (not shown), if desired via a pressure limiting valve 3 (shown only in dotted lines) to a brake adjustment valve device 4. The pressure limiting valve 3 can be set to a constant maximum pressure, upon whose attainment it closes the passage through line 2. It can also be controlled in terms of vehicle load, so that it permits an increasing maximum pressure in line 2 as vehicle load increases. The brake adjustment valve device 4 is actuable manually, indirectly by a pressure medium or electrically, and it serves for supplying braking pressure to a brake pressure line section 5. The latter leads to an emergency brake valve 6 which (according to the present embodiment) is electrically switchable and which, in its excited condition, assumes an operating position in which it connects the brake pressure line section 5 with a brake pressure line section 7 leading to the brake cylinders (not shown). In its operating position, the emergency brake valve 6 cuts off an emergency brake line from the brake pressure line sections 5 and 7. Upon de-energization, emergency brake valve 6 switches over to its emergency braking position, in which it cuts off brake pressure line section 5 and connects brake line 8 with brake pressure line section 7. This position is shown in FIG. 3.

Downstream of the optionally provided pressure limiting valve 3, a line 9 branches off line 2; this line 9 is connected with emergency brake line 8 via a nozzle 10 of relatively small cross section, namely, the emergency brake nozzle. The hydraulic chambers on both sides of nozzle 10, i.e., line 9 and emergency brake line 8, are connected to end connections 11 and 12 on both sides of a cylinder 13. In this cylinder, there is a sealingly, axially displaceably guided piston 14 which partitions the interior of the cylinder into a chamber 15 connected with end connection 11 and a chamber 16 connected with end connection 12. Chamber 16 contains a spring 17 loading piston 14 for displacement in the direction of end connection 11 on the hydraulic accumulator side, where piston 14 is checked by an adjustable abutment. This abutment may be constituted, as shown in FIG. 3, by a cylinder cover 18 which is sealingly displaceably guided along the wall of cylinder 13, and against which piston 14 is positioned by the force of spring 17 and which, on its other side, abuts against an adjusting collar 19 screwed into a threaded portion of cylinder 13.

During normal braking operation, with emergency brake valve 6 in operating position and brake pressure line sections 5 and 7 mutually connected, brake adjustment valve device 4 controls the vehicle braking process in the conventional manner through corresponding brake pressures. Chambers 15 and 16 are filled with hydraulic medium and are at the same pressure, while spring 17 keeps piston 14 in contact with cylinder cover 18.

Upon emergency braking, emergency brake valve 6 switches into its illustrated emergency braking position and connects, as already explained, emergency brake line 8 with brake pressure line section 7, and hence with the brake cylinders. With previously released brakes, the brake cylinders are without pressure, hydraulic medium flows rapidly from chamber 16 and emergency brake line 8 to the brake cylinders, and a certain pressure drop occurs in chamber 16 and emergency brake line 8. At piston 14 there is a certain pressure differential which begins to displace piston 14 against spring 17. Pressure medium flows rapidly and substantially freely from the hydraulic accumulator 1 through line 2, if desired through pressure limiting valve 3, through line 9 and end connection 11 into enlarging chamber 15, causing piston 14 to be further displaced toward end connection 12. Pressure medium is rapidly expelled from chamber 16 which is diminishing because of the piston movement, through emergency brake line 8 and brake pressure line section 7 to the brake cylinders, and rapidly fills the latter until the attainment of brake application with hydraulic medium. At this point in time, piston 14 reaches its end position adjacent end connection 12 and discontinues its movement.

Figure 4:
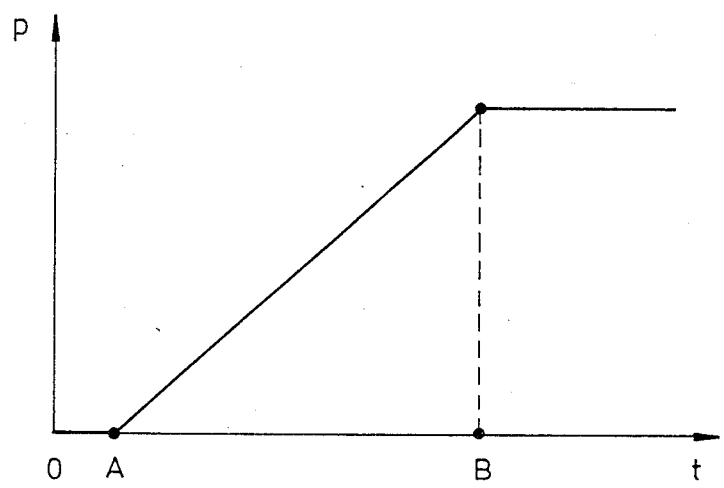
FIG. 4 is a diagram similar to the above referred to FIGS. 1 and 2, showing pressure as a function of elapsed time.

During this process, a small amount of hydraulic medium also flows through nozzle 10 into emergency brake line 8. It is obvious that, in order to fill the brake cylinders up to the point of brake application, no throttle is effective in the brake cylinder supply path, so that this filling process to the point of brake application proceeds very quickly, as indicated in FIG. 4 by the short time interval between moment 0 at the start of emergency braking and moment A at the point of brake application. Upon brake application, with piston 14 remaining in its end position adjacent end connection 12, further hydraulic medium can flow to the brake cylinders only throttled by nozzle 10 through emergency brake valve 6 remaining in its emergency braking position, and can therefore only effect a gradual braking pressure increase in the brake cylinders, determined by the cross section of nozzle 10, as shown in FIG. 4 between points A and B. The brake pressure gradient is here so selected that shocks and jolts are limited to those which are acceptable to the occupants of the vehicle, and that even for coupled vehicles no great push and pull demands arise due to differing braking phenomena. The braking process hence proceeds entirely without shock or jolt loads excessive for the occupants.

Figure 1:
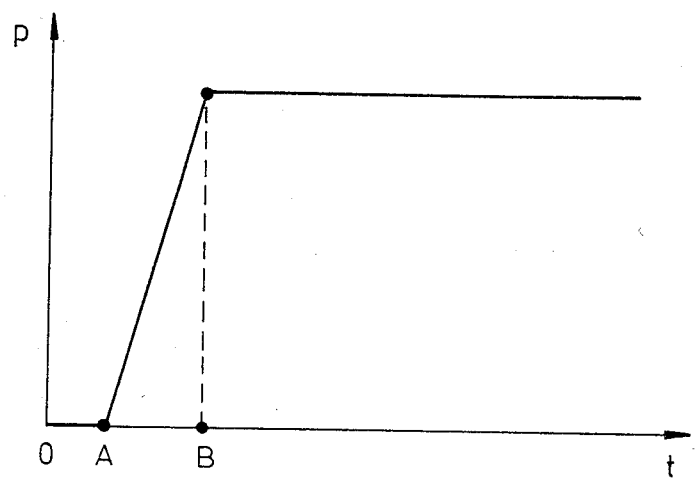
FIGS. 1 and 2 show pressure as a function of time for large and small calibrated passages respectively
Figure 2:
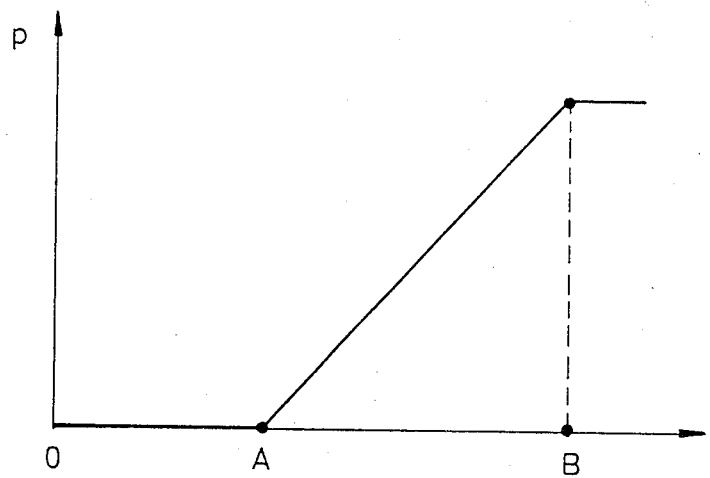

FIG. 4 further shows that only a moderate time interval, acceptable for emergency braking, is required from the start of emergency braking (point 0) to the attainment of maximum brake pressure (point B). A comparison of FIGS. 1, 2 and 4 shows that the hydraulic brake assures the short dead times 0–A between the start of emergency braking (point 0) and brake application (point A), in a manner which was possible only with prior art structures having relatively large calibrated passages, while being followed by relatively gentle braking, which was possible in prior art structures only by use of small calibrated passages.

Upon attainment of maximum brake pressure during emergency braking, spring 17 begins to move piston 14 in the direction of end connection 11, causing pressure medium to be forced out of chamber 15 through nozzle 10 to chamber 16. Piston 14 gradually reaches its end position adjacent end connection 11 with abutment against cylinder cover 18. For subsequent emergency braking, emergency brake valve 16 is again switched into its operating position, whereupon the braking pressure is again reduced from the braking cylinders through brake pressure line section 5 and brake adjustment valve device 4.

By means of collar 19, the volume of chamber 16 can be so adjusted, when piston 14 abuts against cylinder cover 18, that piston 14 by its movement to the end position adjacent end connection 12 expels a volume of hydraulic medium which is just sufficient for filling the brake cylinders. Since the vehicle brakes are conventionally equipped with brake slack adjusters, the amount of hydraulic medium required for filling the brake cylinders to the point of brake application remains constant independently of the wear condition of the brakes, so that adjustment of the volume of chamber 16 to such wear condition is unnecessary, a one-time setting being sufficient.

What is claimed is:

1. A hydraulic vehicle brake having brake adjustment valve means (4) supplied from a hydraulic accumulator (1) for forming a brake pressure ro be conducted to brake cylinders by a brake cylinder pressure line (7) with an emergency brake valve (6) arranged between said brake, adjustment means and said brake cylinder pressure line, said emergency brake valve in its operating position connecting said brake adjustment valve means with said brake cylinder pressure line, and in its emergency braking position interrupting this connection and connecting said hydraulic accumulator (1) to said brake cylinder pressure line via a calibrated passage, comprising (a) a nozzle (10) in the connection between said hydraulic accumulator (1) and said emergency brake valve (6) for limiting the brake pressure gradient to braking with limited shocks and jolts;

(b) hydraulic chambers (9, 8) on both sides of said nozzle (10) connected to end connections (11, 12) on both sides of a cylinder (13); and (c) a piston (14) sealingly displaceably positioned in said cylinder (13), said piston being resiliently loaded in a direction of displacement toward the end connection (11) at the hydraulic accumulator side.

2. Brake according to claim 1, wherein said piston (14) is loaded by a spring (17).

3. Brake according to claim 1, comprising an adjustable abutment projecting into the stroke path of said piston (14).

4. Brake according to claim 3, wherein said abutment (18) limits said stroke path on the side of said end connection (11) at the hydraulic accumulator side.

* * * * *